United States Patent [19]

Vettel et al.

[11] Patent Number: 5,038,239
[45] Date of Patent: Aug. 6, 1991

[54] INTEGRATED ELECTRONIC CARD-FRAME ASSEMBLY FOR A RIGID DISK DRIVE

[75] Inventors: Gerald M. Vettel, Pine Island; James M. Rigotti, Rochester; Lyle R. Tufty, Elgin, all of Minn.

[73] Assignee: International Business Machines Corporation, Armonk, N.Y.

[21] Appl. No.: 305,226

[22] Filed: Jan. 31, 1989

[51] Int. Cl.⁵ .................................................. G11B 17/02
[52] U.S. Cl. .................................................. 360/98.01
[58] Field of Search .......................... 360/97.03, 98.01

[56] References Cited

U.S. PATENT DOCUMENTS 4,714,972 12/1987 Biermeier et al. ............... 360/97.03

*Primary Examiner*—Robert S. Tupper
*Attorney, Agent, or Firm*—Robert W. Lahtinen

[57] ABSTRACT

A disk drive within the dimensional confines of a form factor can optimize volumetric density by using the full height dimension to house disks, but must thereafter utilize the remaining space for electrical components. The structure shown uses a stack of parallel cards with an interface card on the rear end wall to provide the principal drive control and data circuits exterior of the head-disk assembly (HDA). The motor driver circuitry is mounted on a flat flexible cable and is secured to the front wall at the opposite end of the drive in heat transfer relation. The heat generating motor drive circuits are physically isolated from the data/control circuits by the frame and HDA while some of the printed circuit cards are secured to the frame in a manner that enhances rigidity; the allocation of modules to the cards anticipates flow of data and control signals to minimize the number of connections and signal delays that impair performance.

12 Claims, 3 Drawing Sheets

INTEGRATED ELECTRONIC CARD-FRAME ASSEMBLY FOR A RIGID DISK DRIVE

FIELD OF THE INVENTION

The invention pertains to rigid disk magnetic storage devices and more particularly to the structure and arrangement of the electrical component packaging in a disk drive that has optimized volumetric storage density within a set form factor.

BACKGROUND

Disk drive dimensions are normally limited by a form factor, an industry standard of length, width and height dimensions. This is a rigid standard that is often more the result of accident than design. The standard is usually the result of a progression of events starting with a flexible disk drive, that sets the standard or in accordance with which using systems provide space in their designs. Rigid disk drives have usually been adapted to replace a flexible disk drive in the same space and have therefore been required to meet the same dimensions in order to obtain acceptance from the users of such storage devices. Drives incorporating 3½ inch disks have a form factor that is 5.75 inches long, 4 inches wide and 1.625 inches high.

Disk drives are continuously being redesigned to maximize areal density of data on each disk. In the present invention the disk drive design has been maximized for volumetric data density of the entire drive rather than just areal density of the data on each disk. The goal of volumetric density is to increase the number of disks and the number of electronic support features for the disk drive within the form factor for the disk drive assembly. Maximizing volumetric density includes not only packing more disks in the vertical form factor for the disk drive assembly, but also where to place the electrical components exterior of the enclosed head-disk assembly such as the data channel electronics that go with the disk pack, microprocessor, servo and motor drive electronics. As the number of disks and storage capacity increase, the data handling and manipulation tasks become more complex as the opportunities for electronic component mounting diminish. The first casualty as the disk stack height is increased is the large printed circuit card, coextensive with width and length that has commonly extended along the entire bottom surface.

SUMMARY OF THE INVENTION

In the electronic mounting structure of the present invention, an interface card is mounted at the back wall of the frame and carries the input/output connectors and power connector that attach the drive to the using system The card also carries functions such as an interface controller and also memory managing circuitry. The card is connected to a micro card which includes a microprocessor and memory. The micro card is mounted on the frame by four bolts at the corners of the card to the lower portion of the device frame. The mounting of both interface and micro cards directly to the frame adds to the rigidity of the frame assembly. Elastomeric connectors electrically interconnect the micro card to the ISERE card and the latter to the VFO card as a rigidly interconnected stack. A data card overlies the micro, ISERE and VFO cards as a fourth generally parallel card in a stack, but is mounted on the HDA enclosure with connection to the VFO card by a flexible flat cable. The flat actuator cable from within the HDA terminates on both the data card and VFO card.

Since the HDA enclosure portion that houses the actuator voice coil motor assembly is less than the full vertical height of the device, it is possible for the lower micro card and the data card to extend the full width of the device respectively below and above that enclosure portion. The flow of data and control signals is organized on the cards so that sequential functions are resident on the respective cards in a manner that minimizes the number of lines between the cards and the length of conductors that would reduce performance.

The spindle and voice coil motor circuitry are mounted on a flat flexible cable that extends beneath the head-disk assembly from a connector on the micro card and terminates in portions that are mounted on the front wall and adjoining side wall portions. The driver circuits are mounted on the interior surface of the front wall while the opposing exterior surface is grooved to provide an extended surface for thermal transfer while the predriver and other auxiliary circuits are attached to the adjoining side walls. Thus the data and command circuits are isolated from the motor circuits that handle the most power and are prone to cause thermal problems.

DETAILED DESCRIPTION

Figure 1:
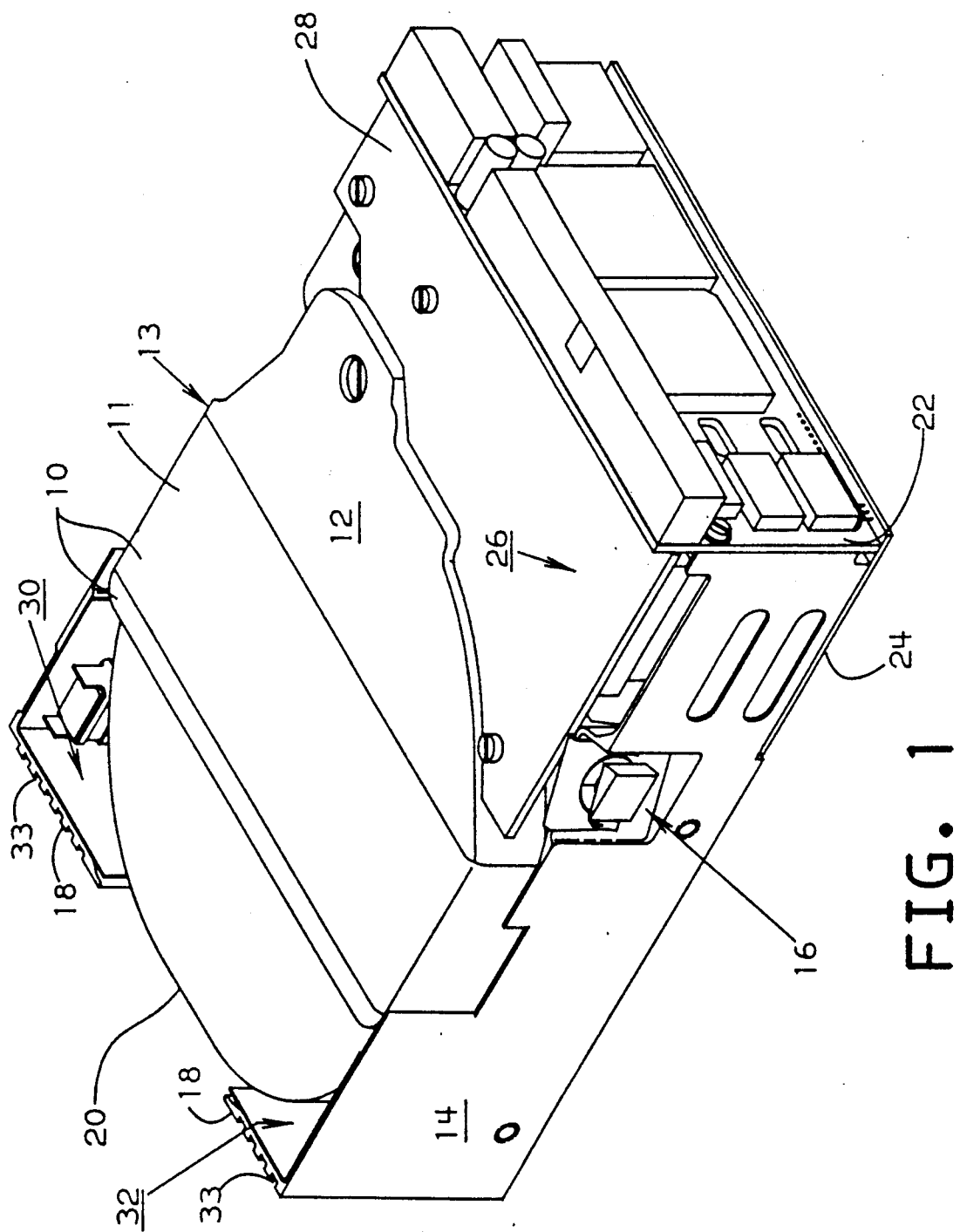
FIG. 1 is an isometric view of a disk drive incorporating the present invention.

Referring to the drawing, FIG. 1 is a completely assembled disk drive illustrating the preferred embodiment of the invention. The disk drive cast body 12 is shock mounted in frame 14 by three shock mounts 16 (one of which is shown). The disk stack is dust sealed by cover 10 which is secured and sealed to body 12 by a band of thin tape 11. The sealed enclosure formed by the cast body 12, cover 20 and sealing tape 11 serves to enclose and seal the disk and actuator assemblies to form a head-disk assembly (HDA) 13. The body 12 portion which overlies the disks and transducer mounting structure fills the vertical height of the disk drive assembly and the disk drive form factor height dimension, except for sufficient clearance to permit passage of the flat cable connected to the motor driver circuits and accommodate the vertical sway associated with the shock mounting. The frame front wall 18 is cut away to allow the front surface 20 of disk stack cover 10 to approach the forwardmost limit of the form factor length dimension.

The electronics for the drive, which are positioned outside the HDA 13, are attached to the back of frame 14 and packed into the corners between the HDA 13 and frame 14. The bus interface electronics are printed on circuit card 22 attached to the back wall of frame 14. The data channel and servo circuits are on a micro card 24 attached at the rear bottom of frame 14 (only the edges of which are visible in FIG. 1), a stack of cards in the corner 26 of the drive and a data channel card 28 mounted at the rear top of frame 14. The spindle motor drive circuits are mounted on a flex cable folded and bonded to the inner walls of frame 14 in the corner 30. The voice coil motor drive circuits for the actuator are also mounted on a flex cable folded and bonded to the inner walls of frame 14 in corner 32. The frame front wall 18 also has grooves 33 to provide an extended surface for dissipation of heat from the motor drive circuitry secured to the inner surface of wall 18.

Figure 2:
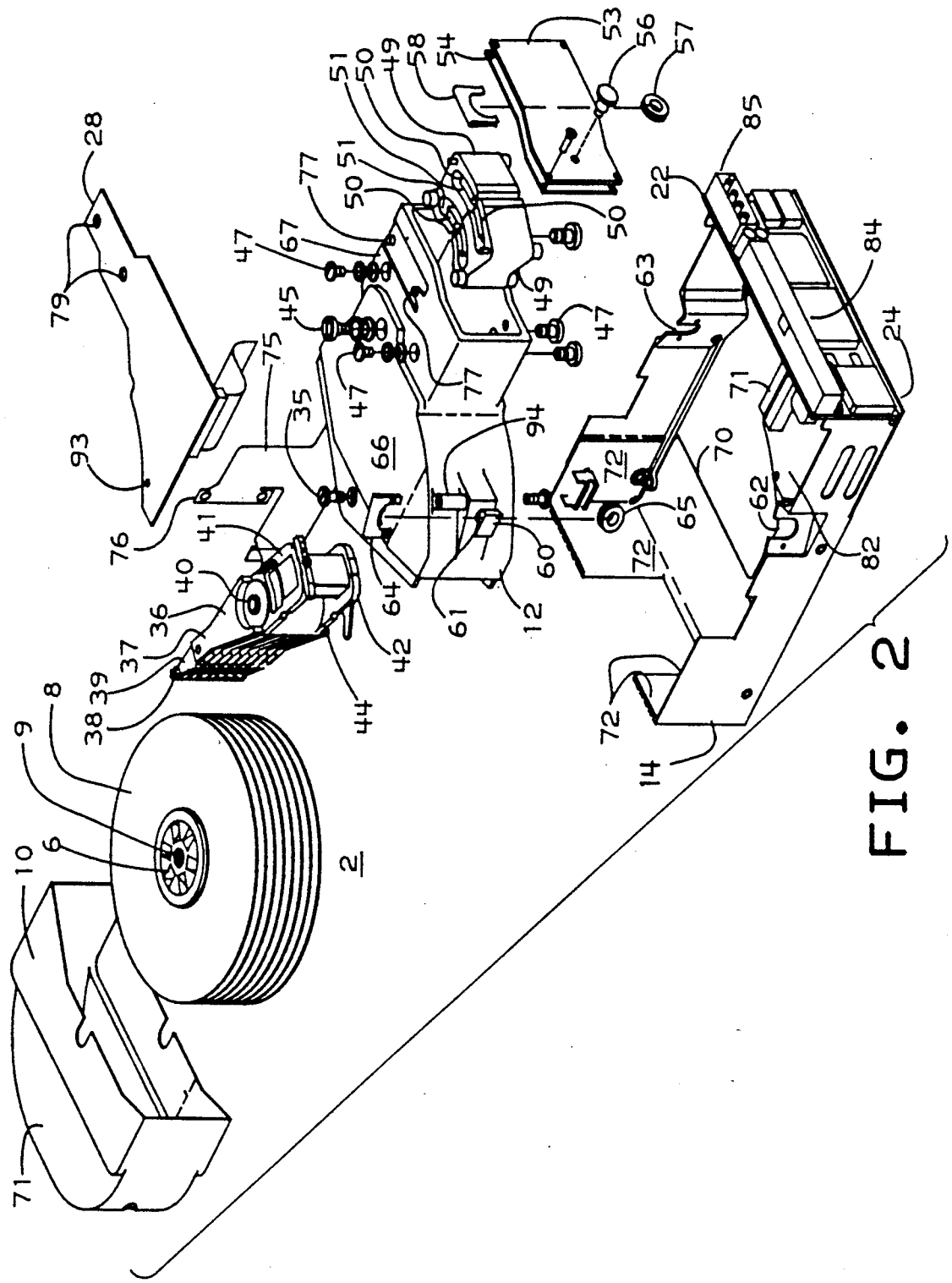
FIG. 2 is an exploded view of the disk drive of FIG. 1 showing the components of the head-disk assembly and portions of the electrical assembly.

FIG. 2 shows the organization of the mechanical and electrical elements within the form factor and mounted on frame 14. The disks 8 are mounted about a hub 6 which contains the spindle drive motor (not shown). The spindle shaft 9, which forms a part of the wound stator of the spindle drive motor, is secured at each end to the body 12 by bolts 35 (one of which is shown). The actuator body 36 has a comb portion that presents a series of arms 37. The upper and lower arms 37 carry a single transducer 38 and resilient suspension 39 which respectively confront the uppermost and lowermost data surfaces of the stack of disks 8 while each intermediate arm that extends between confronting disk surfaces carries two transducer/suspension assemblies respectively confronting the data surfaces facing the supporting arm. At the opposite side of the shaft 40, about which the body 36 pivots, projections 41, 42 support a voice coil motor coil 44. The actuator shaft 40 is secured to body 12 by an upper bolt 45 and a similar lower bolt which is not visible. Also mounted on body 12 by a series of bolts 47 are a pair of voice coil motor core elements 49 in the form of members having an E shaped cross section which abut one another and which have permanent magnets 50 attached thereto. This core assembly provides an air gap 51 across which a magnetic field is maintained and in which the vertically extending stretches of the voice coil 44 are positioned. A cover 53 and gasket 54 are secured to the open end of body 12 to cover and seal the end.

A shock mount pin 56 is mounted on cover 53. The shank portion of pin 56 is surrounded by an elastomer ring 57 and received in a U-shaped recess (not visible) in the back wall of frame 14 and retained therein by a clip 58. Body 12 projection 60 includes a shank 61 which is surrounded by an elastomer ring 65, received in U-shaped frame recess 62 and retained therein by clip 54. A similar shock mount assembly, carried by body 12, is received in frame 14 U-shaped recess 63.

The maximum height of body 12 extends from surface 66 to the corresponding bottom surface. This vertical dimension uses the total height available within the form factor vertical dimension less the thickness of the flex cable 70 and the vertical sway space required by the shock mounting. The casting end portion 67, which houses the actuator voice coil motor assembly, has a reduced height to permit micro card 24 to extend below and data channel card 28 to extend thereover. Cover 10 includes a reduced height portion 71 over the disk stack where it is not necessary to enclose a transducer suspension assembly in addition to the disk stack. Flex cable 70 extends from micro card 24 and has folded portions 72 which are adhered to the inner wall surfaces of frame 14. The motor driver circuits, which require greatest heat dissipation, are mounted at the interior of rear wall 18 that is provided with an extended heat transfer surface by grooves 33.

The actuator data channel and servo electronics are connected by a flat cable which connects the transducer coils to the drive electronics outside the HDA 13. Terminations at cable end 76 (which attaches to body 12 about pins 77) are connected to a connector mounted at the lower surface of data card 26 through openings 79. The end of cable 75, which is obscured by the body 12 in the exploded view, attaches to connector 81 on the card 82. Card 82 is mounted between micro card 24 and data card 28 in the frame corner 26. The interface card 22 that is mounted to the rear wall of frame 14, includes an interface connector 84 that interchanges data and control signals with the using system and a power connector through which the device receives power and the required supply voltages.

Figure 3:
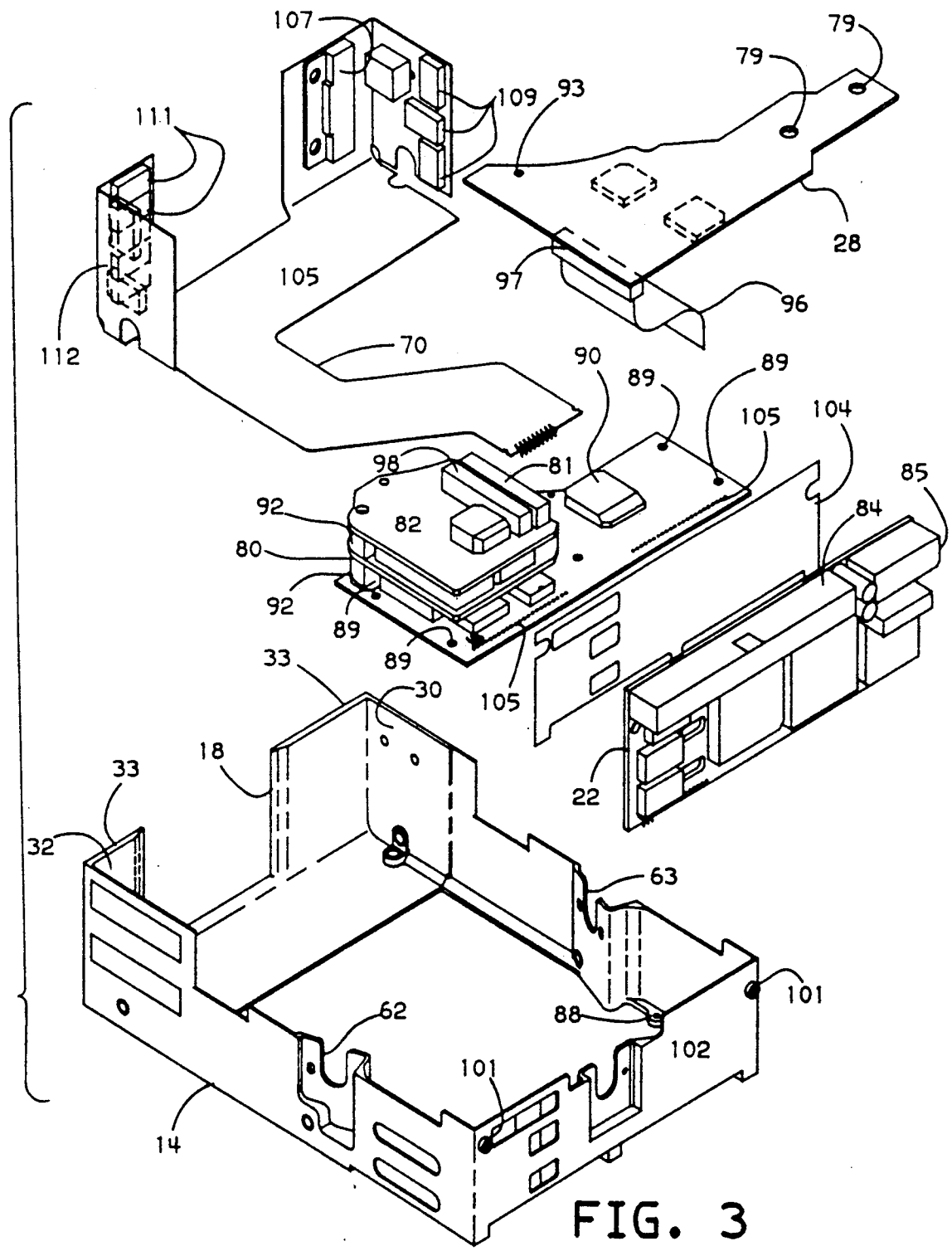
FIG. 3 is an exploded view of the drive of FIG. 1 showing the frame and electrical components that surround the head-disk assembly.

FIG. 3 is an exploded view of the frame and electrical components exterior to the HDA 13. A micro card 24 extends from side wall to side wall of frame 14 and is bolted to four projections 88 (on of which is visible) through card openings 89. This not only mounts card 24 on the frame 14, but also enhances the frame rigidity. The end portion 67 of box frame or body 12 (FIG. 2) which houses and supports the voice coil motor stator elements has a reduced vertical height that permits card 24 to extend thereunder within frame 14 and provides space for mounting electronic components such as PROM 90 providing such components have a sufficiently low profile to preclude mechanical interference with body 12. Immediately above micro card 24 are circuit cards 80 and 82 which have a similar or identical profile and are stacked in the space bounded by the frame 14 and the head-disk assembly box frame 12. ISERE card 80 is electrically connected to underlying micro card 24 and also to overlying VFO card 82 by high density elastomeric connectors in the form of AMPLIFLEX connector assemblies 92 which are a product of AMP, Incorporated. Three bolts extend from beneath micro card 24, through openings in cards 80, 82 and connector assemblies 92 and are secured above card 82 to physically secure and electrically interconnect cards 24, 80 and 82.

Data channel card 28 is mounted on body 12 at openings 79 where the terminal end 76 of actuator cable 75 attaches to a connector on the lower surface of card 28. Card 28 is also attached to body 12 by a bolt through opening 93 which is received in a threaded opening in projection 94 (FIG. 2) Interconnection of cards 28 and 82 is afforded by a cable 96 extending from connector 97 to connector 98 on VFO card 82. Interface card 22 is mounted on frame 14 by a pair of bolts that are received through card openings 100 and secured in the threaded openings 101 in frame 14 end wall 102. An insulator 104 is clamped and held captive between card 22 and end wall 102 to electrically isolate the rear surface of card 22 from the frame end wall 102. Card 24 carries the interface connector 84 and power connector 85 and is electrically connected to micro card 24 contacts 105 by a pair of thirty conductor right angle connectors (not shown).

A spindle motor and voice coil motor flex cable 70 extends from a connector on micro card 24, below the enclosure formed by body 12 and cover 10 and terminates with folded portions 72 that are adhered to frame 14 front wall 18 and the adjoining side wall portions to effectively transfer heat generated by the components on cable portions 72 to the frame wall portions. In frame corner 30, the spindle motor driver circuits 107 are positioned next to the interior surface of front wall 18 and various start up and braking circuits 109 to cable portion 72 attached to the side wall. In the frame corner 32, the voice coil motor driver circuits 111 are mounted on the cable 70 portion 72 attached to the inner surface of front wall 18 with voice coil motor predriver circuitry 112 mounted on the cable portion 72 attached to the side wall.

Thus the motor drive circuits 107, 111, which generate the largest quantity of heat and are capable of introducing the most significant thermal problems are mounted in heat transfer relation to the frame wall with the driver circuits in contact with the front wall 18 which includes the grooved, extended surface 33 to enable heat transfer and dissipation. The motor drive circuitry is positioned at one end of the form factor space and the control and data circuitry is located at the opposite end with the enclosed head-disk assembly between to afford further isolation. The cable 70 may also be used to mount electrical components on the surface portion 115 which is positioned under the reduced height portion 71 of cover 10, provided the maximum height or profile is low enough to avoid mechanical interference including downward sway of the head-disk assembly.

What is claimed is:

1. A magnetic rigid disk data storage device included within a form factor which comprises predetermined length, width and height dimensions comprising
   an enclosure;
   a head-disk assembly including a plurality of disks mounted as a disk stack for rotation in unison and a transducer carrying actuator assembly mounted within said enclosure wherein the disk stack and surrounding enclosure occupy substantially the total height and width dimensions of said form factor;
   motor means for rotating said disk stack, said motor means being supported within said enclosure;
   a rigid frame;
   mounting means connecting said head-disk assembly to said frame; and
   electrical components, supported on said frame and mounted exterior said head-disk assembly and within the dimensions of said form factor, including control circuit means comprising microprocessor, data channel and servo circuits supported by said frame at one radial side of said disk stack and motor driver circuitry at a radial side of said disk stack supported by said frame at another radial side of said stack and isolated from said control circuit means by said head-disk assembly and surrounding enclosure.

2. The magnetic rigid disk data storage device of claim 1 wherein said rigid frame has opposite end walls and one of said end walls has motor driver circuits secured to the interior wall surface in heat transfer relation.

3. The magnetic rigid disk data storage device of claim 2 wherein the exterior surface of said one end wall is formed to create an extended surface to enhance heat dissipation from said driver circuits.

4. The magnetic rigid data disk storage device of claim 3 wherein said frame is a cast member and said exterior surface of said end wall is grooved to provide an increased surface area.

5. A magnetic rigid disk data storage device included within a form factor which comprises predetermined length, width and height dimensions comprising
   an enclosure;
   a head-disk assembly (HDA) including a plurality of disks mounted as a disk stack for rotation in unison and a transducer carrying actuator assembly mounted within said enclosure wherein the disk stack and surrounding enclosure occupy substantially the total height dimension of said form factor in at least the region axially adjoining said disk stack where the actuator assembly must also be received and wherein the enclosed disk stack occupies substantially the total width of said form factor;
   motor means for rotating said disk stack, said motor means being supported within said enclosure;
   a rigid frame;
   mounting means connecting said HDA and surrounding enclosure to said frame; and
   electrical components mounted exterior of said HDA and within the dimensions of said form factor including control circuit means comprising microprocessor, data channel and servo circuits supported by said frame, said electrical components being carried on a series of least three parallel printed circuit cards mounted at one radial side of said disk stack.

6. The magnetic rigid disk data storage device of claim 5 wherein said HDA includes a reduced height portion radially outward of said disk stack and said series of parallel mounted printed circuit cards including an upper card that extends over said HDA reduced height portion and a lower card that extends below said HDA reduced height portion.

7. The magnetic rigid disk data storage device of claim 6 which further comprises a printed circuit interface card attached to the exterior surface of a first end wall of said frame which is adjacent said series of parallel mounted printed circuit cards, said interface card carrying an interface connector to connect control and data lines to a using system and a power connector for receiving power to drive said data storage device.

8. The magnetic rigid disk data storage device of claim 7 wherein the lowermost of said series of parallel mounted printed circuit cards extends from one side wall of said rigid frame to the other side wall of said rigid frame and is attached to each of said frame side walls at plural spaced locations to support said circuit card on said frame and to enhance the rigidity of said frame.

9. The magnetic rigid disk data storage device of claim 8 wherein said interface card is secured to said frame first end wall at multiple locations to support said interface card on said wall and provide additional rigidity to said rigid frame.

10. The magnetic rigid disk data storage device of claim 7 wherein said electrical components further comprise motor driver circuits which are mounted on a rigid frame second end wall that is opposite said one end wall and separated from said series of parallel mounted printed circuit cards by said HDA.

11. The magnetic rigid disk data storage device of claim 10 wherein said motor driver circuits are mounted on said second end wall in heat transfer relation therewith and said second end wall is provided with an extended area exterior surface to enhance heat dissipation.

12. The magnetic rigid disk data storage device of claim 11 wherein said motor driver circuits are mounted on a flexible wiring substrate.

* * * * *